Oct. 6, 1931.                B. BOULOGNE                  1,825,937
          DEVICE FOR INTERCONNECTING THE EVAPORATION
                ELEMENTS OF EVAPORATION PLANTS
                       Filed June 21, 1928
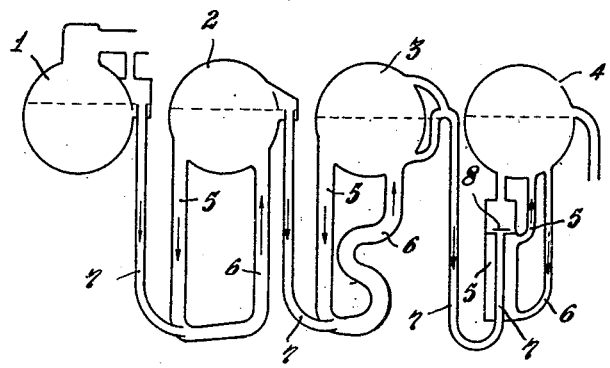
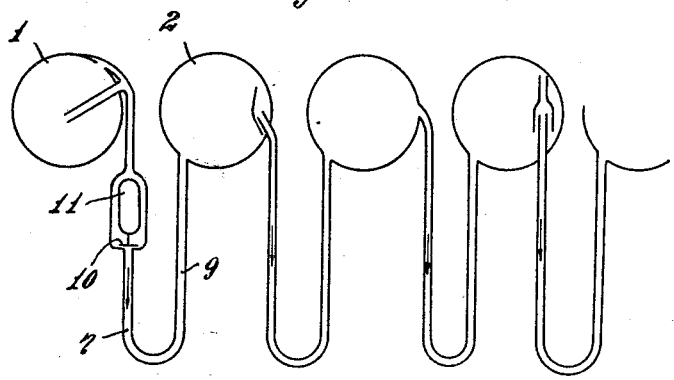
B. Boulogne
   INVENTOR Patented Oct. 6, 1931

1,825,937

UNITED STATES PATENT OFFICE

BALTUS BOULOGNE, OF PASOEROEAN, JAVA, DUTCH EAST INDIES

DEVICE FOR INTERCONNECTING THE EVAPORATION ELEMENTS OF EVAPORATION PLANTS

Application filed June 21, 1928, Serial No. 287,307, and in the Netherlands June 25, 1927.

My invention relates to an improvement for interconnecting the evaporation elements of evaporation plants, such as are used for example in sugar factories.

When devices for automatically regulating the liquid level are used, this connection may consist of a U-shaped conduit, the one branch of which is connected with one evaporating element and the other branch of which is connected with the other evaporating element. The height of the U-shaped conduit is then determined by the difference in pressure in both evaporating elements, in order to keep the various pressures on the liquid in both branches of the conduit in equilibrium by the liquid column. This height may therefore vary between 1 and 8 m. in accordance with the difference in pressure.

A second circumstance, which has to be taken into account in interconnecting the evaporating elements, is the possibility that in consequence of the entrance of liquid of a higher temperature than that which corresponds with the boiling point in the following evaporating element the liquid suddenly begins strongly to boil in the branch of the U-shaped conduit connected with the following evaporating element, causing the conduit to be emptied.

In order to prevent this I have made the device according to this invention such that the liquid is cooled on its way to or on its entrance into the next evaporation element.

This cooling device may be arranged in various ways, for example by providing a cooling jacket around part of the connecting conduit and by having water or another cooling liquid circulated therein.

The device is preferably made such that the liquid coming from the one part of the connecting conduit is intensively mixed with the liquid in that part of the conduit conducting to the following element. In order to facilitate this mixing the latter part of the conduit may be formed by a relatively wide pocket or other extension of the second evaporating element or it may also consist of a U-shaped circulation conduit, connected with both branches to this element. In both cases the conduit coming from the first element is connected to this extension or conduit at a low point.

In order to prevent blowing empty of the U-shaped connecting conduit and at the same time to limit the length of this conduit, according to my invention a non-return valve eventually spring- or weight-controlled, may be arranged in this conduit in such a way that part of the difference in pressure existing between the two evaporating-elements connected by this conduit is wanted to overcome the resistance of this valve.

The same may be attained by providing in the branch of the connecting conduit connected to the first evaporating element a float valve or other automatically closing member.

The drawings schematically illustrate some embodiments of the invention.

Fig. 1 shows three embodiments of the connecting conduit between two evaporation-elements, and Fig. 2 shows the device with a float-valve.

In Fig. 1 the various evaporation elements are indicated by circles 1, 2, 3 and 4.

The connection of the evaporation elements 1 and 2 is constituted by a U-shaped circulation-conduit 5, 6, connected to the element 2, and a conduit 7 connecting the first element with the lowest point of the conduit 5, 6. In consequence thereof the liquid leaves the element 1 through the conduit 7 and passes over into the liquid of the element 2, which circulates in the conduit 5, 6, which mixing action causes the entering liquid to be cooled, thus preventing too violent boiling.

The connection between the elements 2 and 3 differs only from that as described above in that the conduit 6 has a different shape, namely such that a circulation in the sense as indicated by arrows is promoted.

In the connection between the elements 3 and 4 part of the conduit 5 forms a cooling jacket around the conduit 7, which leads separately to the evaporation-element 4. In the embodiment a loaded non-return valve 8 is applied in the conduit 7, which enables a decrease in the height of the conduit 7 and also prevents that the device is blown empty.

Another method having the same purpose, is shown in Fig. 2. In this embodiment that part of the connecting conduit which is connected with the element 2, consists in a conduit 9, instead of in a U-shaped conduit 5, 6, as shown in Fig. 1, while further in that part of the conduit indicated by 7 a valve 10 with a float 11 is provided. It is clear that this valve only opens when there is a certain volume of liquid in the conduit 7.

I claim:

In an evaporating plant having a series of evaporating elements, an individual U-shaped circuit member for all but the first of said elements, said circuit members depending below the units and opening into said units near the bottom thereof, and an overflow pipe connection from the side and above the bottom of one of the elements to the lowermost point of the U-shaped member of the next element in the series, whereby the level of the liquid in each element is kept constant and the liquid passing through an overflow pipe connection from one element to the next is pre-cooled in the circuit member of the next element before entering the latter.

In testimony whereof I affix my signature.

BALTUS BOULOGNE.